March 8, 1938.                S. T. WILLIAMS                2,110,386
                        HYDRAULIC PRESSURE GAUGE
                          Filed July 25, 1936

INVENTOR
Selden T. Williams,
BY
Fraser, Myers & Manley
ATTORNEYS.

Patented Mar. 8, 1938

2,110,386

UNITED STATES PATENT OFFICE 2,110,386

HYDRAULIC PRESSURE GAUGE

Selden T. Williams, Bellerose, N. Y., assignor to Scovill Manufacturing Company, Waterbury, Conn., a corporation of Connecticut Application July 25, 1936, Serial No. 92,495

8 Claims. (Cl. 73—111)

My present invention relates to hydraulic pressure gauges and more particularly to oil pressure gauges of the piston type, and aims to provide certain improvements therein.

The primary objections to direct acting piston type hydraulic gauges are (1) they are too large to normally replace the dial type gauges; (2) seepage takes place past the piston and accumulates in the gauge housing; and (3) they are not readily adapted for replacing the standard dial gauges now in use.

The foregoing objections are entirely overcome by the gauge of the present invention which has among its objects the following: (1) to provide a direct acting piston type hydraulic gauge having dimensions adapted to permit it to directly replace standard dial gauges; (2) to provide such gauge with a drain outlet whereby the seepage or "weeping" past the piston will be returned to the main hydraulic supply of the system; (3) to provide such gauge which may be readily assembled and economically produced; (4) to provide such gauge whereby a standard housing may be utilized for gauges having different pressure ranges from 0-300 or more lbs. per sq. in.; (5) wherein a flanged cup is employed which permits telescoping the gauge spring within the housing and prevents injury to the spring by stopping its compressive action at a safe point; and (6) to provide such gauge with a sealing clip which may be soldered to the adjusting screw nut for the spring and engage in a slot in the housing to insure against tampering with the spring adjustment after the gauge has been calibrated and set.

The foregoing and other objects and advantages of the invention will be better understood from the detailed description which follows when considered in conjunction with the accompanying drawing showing a preferred embodiment of the invention, and wherein Figure 1 is a longitudinal section through a gauge embodying my invention, said section being taken substantially along the plane of the line 1—1 of Fig. 2.

Figure 1:
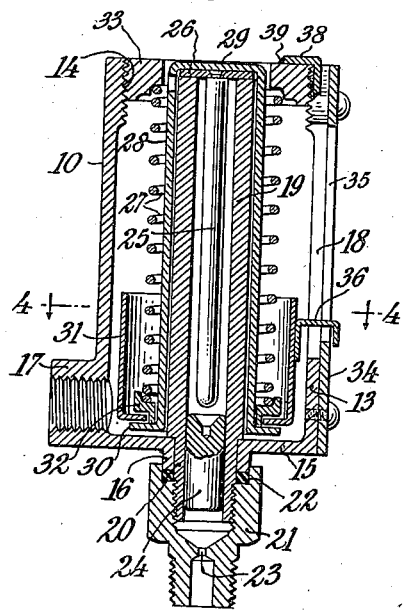
Figure 2:
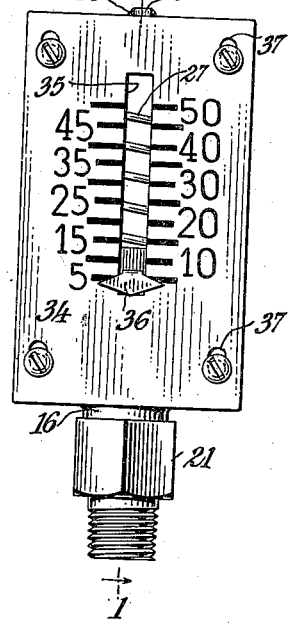
Fig. 2 is a front elevation of the gauge.

Referring to the drawing, let the numeral 10 indicate a housing of substantially greater than semi-cylindrical form having a semi-cylindrical wall 11, parallel side walls 12 continuing from the ends of the semi-cylindrical wall, and a flat wall 13 connecting the ends of the side walls 12.

The housing is preferably open at its top whereat it is internally screw-threaded, as indicated at 14, and at its bottom is provided with a wall 15 having an outwardly directed tubular extension 16 which is coaxial with the screw-threaded opening in the top of the housing. Extending laterally from the semi-circular wall 11 at the bottom wall 15 of the housing is an internally screw-threaded tubular member 17. The flat wall 13 which constitutes the front wall of the gauge housing is preferably formed with a longitudinal slot 18 extending centrally thereof terminating short of the base of said wall. The housing may be formed of any suitable material in any convenient manner but preferably is formed as a casting of iron or other suitable metal.

Mounted within the housing is a tubular member 19 formed at its lower or inner end with a reduced portion 20 of a diameter to closely fit within the tubular extension 16 and project therebeyond. At the juncture of the reduced tubular extension with the main portion of the tubular member there is a shoulder which seats against the top face of the bottom wall 15 of the housing. The protruding end of the tubular member is preferably externally screw-threaded and engages within a tubular fitting or adapter 21 which serves to hold the tubular member in assembled relation with the housing. To provide a leak-tight assembly between said parts a packing washer 22 may be interposed between the adapter fitting 21 and the tubular extension 16. The adapter 21 may be of any desired size for coupling the gauge with a hydraulic pressure line and may be provided with an opening 23 therethrough to suit the viscosity of the liquid and the pressure to be tested by the gauge. When mounted in the housing the tubular member 19 will extend to a point just below the top of the casing, for a purpose which will presently be made apparent.

The bore through the tubular member is smooth and of uniform diameter and has mounted therein a plunger type piston 24 responsive to hydraulic pressure received in the tubular member through the adapter 21, the fit of the piston within the tubular member being such as to permit liquid to seep or "weep" past the piston. This "weeping" past the piston causes the liquid to collect in the tubular member above the piston and to pass therefrom into the gauge housing. To avoid the accumulation of liquid in the housing the lateral tubular extension 17, which may be connected with a conduit (not shown), will serve as a drain outlet to return said liquid to its source of supply.

For resisting the movement of the piston 24 under hydraulic pressure the piston is loaded by spring pressure or the like, and as herein shown, this is accomplished in the following manner: A rod 25 unconnected to the piston extends down into the bore of the tubular member and is carried by a washer 26 to which it may be suitably secured, as by riveting or the like, the washer being adapted to seat upon the upper end of the tubular member and to be held thereagainst by the action of a coil spring 27 which acts upon an inverted cup-shaped member 28, the base 29 of which bears upon the washer 26 and the tubular wall of which telescopes over the outer wall of the tubular member 19. At its innermost or lower end the cup-shaped member is provided with an outwardly directed flange 30. Preferably the tubular member 19 is formed with an external contour which will provide a clearance between it and the wall of the cup-shaped member 28 so as to permit the free passage of fluid from the interior of the tubular member into the housing, and as herein shown, the exterior of the tubular member is of polygonal cross-section. The cup-shaped telescoping member 28 supports at its flanged end a cup-shaped member 31 which is held in swiveled relation to the member 28 through the medium of a spring seat member 32 of general Z-shaped cross-section, which, on its upper face, has a recess for accommodating one end of the spring 27, and at its lower face has a recess for receiving the flange or base of the cup-shaped member 31. The spring 27 at its outer or upper end bears against an adjustable screw nut 33 which threadedly engages within the screw-threaded opening at the top of the housing and is centrally apertured to permit movement therethrough of the cup-shaped member 28. The screw nut 33 also serves as an abutment for engaging the top edge of the cup-shaped member 31 thereby limiting the compression of the spring to a safe point and preventing injury thereto.

Figure 3:
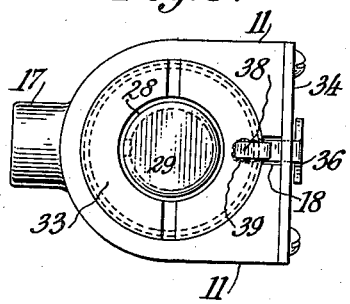
Fig. 3 is a top plan view of the gauge.
Figure 4:
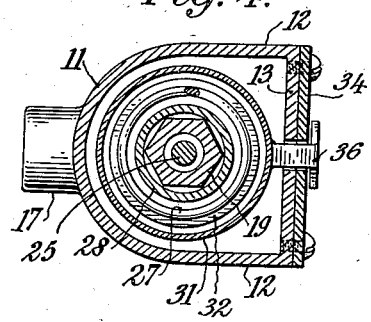
Fig. 4 is a section taken substantially along the plane of the line 4—4 of Fig. 1.

For indicating the pressures to which the gauge is subjected there is mounted on the flat wall 13 of the housing a graduated or index plate 34 having a longitudinal central slot 35 therethrough coinciding with the slot 18 in the wall 13 in the housing and through which a pointer or indicator 36 extends. Preferably the indicator 36 is in the form of an inverted U-shaped element fixedly carried by the wall of the cup 31, which cup and pointer may be assembled into the housing through the open slotted top thereof. It will be noted that the index plate 34 is formed with elongated slots 37 through which the screw means extend for adjusting the zero of the gauge when securing the plate to the housing. Also, in calibrating the gauge after assembly, it will be necessary to adjust the screw nut 33 to subject the spring 27 to the desired compressive force, and after this has been accomplished, in order to insure such adjustment and avoid unauthorized tampering therewith, there is provided an angular clip 38, as best shown in Figs. 1 and 3, one arm of which is positioned to engage in the top of the slot 18 and the other arm of which will bear on the top of the screw nut to which it may be secured in any desired manner, such, for example, by being soldered thereto as indicated at 39. It will thus be appreciated that the clip 38 will prevent rotation of the screw nut in either direction, thus holding the spring in its desired adjusted state of compression.

From the foregoing detailed description it will be appreciated that the design, dimensions and construction of the hydraulic pressure gauge here disclosed are such as to adapt it to directly replace standard dial gauges at any of the places where such gauges are now employed. It will also be appreciated that in a gauge of the character disclosed, a single standard housing may be employed for different gauges intended to register various pressure ranges. This may be readily accomplished by (a) increasing or decreasing the bore of the tubular member 19 and the size of the piston 24 without changing the spring 27; or (b) by maintaining the piston and bore diameters and increasing or decreasing the strength of the spring.

It will thus be apparent that while I have shown and described a preferred embodiment of my invention, I do not wish to be limited to the details of construction disclosed since it will be understood that these may be varied within the range of engineering skill without departing from the spirit of my invention as claimed.

What I claim is:

1. An hydraulic pressure gauge, comprising a housing in the form of a substantially semi-cylindrical hollow casting having an open internally screw-threaded top, a reduced tubular extension at its bottom coaxial with the opening in the top and a lateral tubular extension adjacent its base, a tubular member of approximately the length of the housing within the housing and extending through the reduced tubular extension at the bottom, a plunger piston within the tubular member responsive to hydraulic pressure received in said tubular member and past which piston a portion of the hydraulic pressure fluid may seep, the tubular member at the rear of the piston communicating through the interior of the housing with the lateral tubular extension, and spring means for resisting movement of the piston when subjected to hydraulic pressure.

2. A fluid pressure gauge, comprising a housing, a tubular member within the housing and adapted to receive fluid under pressure, a piston within the tubular member responsive to the fluid pressure received by the tubular member, a shell telescoping the tubular member and movable through the top of the housing by the piston, a coil spring encircling said shell for resisting movement of the piston when subjected to pressure, a shoulder at one end of the housing against which one end of the spring bears, a spring seat loosely encircling the shell against which the other end of the spring bears and a cup held between the spring seat and a flange on the shell, said cup encircling the spring and being of a depth to abut the shoulder at the top of the housing as the spring is compressed to limit the compression of the spring.

3. A fluid pressure gauge according to claim 2, wherein the housing has a wall thereof formed with a longitudinal slot therein adjacent which slot the wall is provided with pressure indicia, and the cup carries an indicator which extends through the longitudinal slot.

4. A fluid pressure gauge, comprising a housing one wall of which has a longitudinal slot therein and pressure indicia on said wall adjacent said slot, a tubular member within the housing and adapted to receive fluid under pressure, a piston within the tubular member responsive to fluid pressure received by the tubular member, a shell telescopingly mounted on the tubular member and movable by the piston, spring means for resisting movement of the piston when subjected to fluid pressure, and an indicator carried by the shell and extending through the longitudinal slot.

5. A fluid pressure gauge according to claim 4, wherein the indicator is mounted on a cup which is swivelly carried by the shell.

6. A fluid pressure gauge comprising a housing, one wall of which has a longitudinal slot therein adjacent and extending through one end thereof, a tubular member within the housing adapted to receive fluid under pressure, means responsive to fluid pressure received by the tubular member, an indicating member having a part extending through the slot in the housing and movable by the means responsive to fluid pressure, a coil spring within the housing for resisting movement of the pressure responsive means when subjected to fluid pressure, an adjusting nut threadedly engaging in the end of the housing having the slot therein and bearing against one end of the spring for adjusting the initial compression thereof, and a sealing clip secured to the adjusting nut and engaging in the slot in the housing for preventing movement of the nut after adjustment.

7. A fluid pressure gauge comprising a housing open at both ends, a tubular member within the housing and extending beyond one end thereof adapted to receive through said extending end fluid under pressure, said tubular member in proximity to its extending end having an external shoulder seating against an end wall of the housing and being externally screw-threaded at said end, an adapter engaging said threaded end of the tubular member to hold it in assembled relation with the housing, a plunger piston within the tubular member responsive to fluid pressure received in the tubular member, a shell telescoping the tubular member and movable through the opposite end of the housing by the piston, spring means for resisting movement of the piston when subjected to pressure, and pressure indicating means carried by the telescoping shell.

8. A fluid pressure gauge, comprising a housing, a tubular member within the housing and adapted to receive fluid under pressure, a piston within the tubular member responsive to the fluid pressure received by the tubular member, a shell telescoping the tubular member and movable within the housing by the piston, a coil spring encircling said shell for resisting movement of the piston when subjected to pressure, a shoulder at one end of the housing against which one end of the spring bears, a spring seat loosely encircling the shell against which the other end of the spring bears and a cup held between the spring seat and a flange on the shell.

SELDEN T. WILLIAMS.